United States Patent [19]

Long

[11] 4,376,237
[45] Mar. 8, 1983

[54] VEHICLE TURN SIGNAL SWITCH ACTUATOR

[75] Inventor: Donald A. Long, Anderson, Ind.

[73] Assignee: General Motors Corporation, Detroit, Mich.

[21] Appl. No.: 271,691

[22] Filed: Jun. 8, 1981

[51] Int. Cl.³ .......................... H01H 3/12; H01H 9/00
[52] U.S. Cl. ..................................... 200/61.27; 200/4; 200/61.54
[58] Field of Search ................. 200/4.5 R, 6 A, 61.27, 200/61.3, 61.34, 61.35, 61.54

[56] References Cited

U.S. PATENT DOCUMENTS

| | | | |
|---|---|---|---|
| 2,823,272 | 2/1958 | Adams | 200/6 A |
| 3,374,321 | 3/1968 | Trarbach | 200/61.27 |
| 3,401,240 | 9/1968 | Groves | 200/6 A X |
| 4,149,048 | 4/1979 | Winter et al. | 200/4 X |
| 4,204,099 | 5/1980 | Cryer | 200/4 |
| 4,238,650 | 12/1980 | Cryer et al. | 200/4 |
| 4,273,971 | 6/1981 | Tregurtha | 200/4 |
| 4,293,743 | 10/1981 | Iwata et al. | 200/4 |

Primary Examiner—J. R. Scott
Attorney, Agent, or Firm—Warren D. Hill

[57] ABSTRACT

A combination turn signal switch and dimmer switch assembly for automotive vehicles comprises a two part lever comprising an actuator and a handle. The actuator is pivoted to a switch housing for rocking movement about an axis on either side of a neutral position for selective turn signal switch actuation. The handle is pivoted to the actuator about an axis transverse to the actuator pivot axis and is movable between a neutral position and a dimmer switch actuation position. The handle has a V-shaped ramp surface engaged by a leaf spring which serves to press the handle toward its neutral position as well as to cam the actuator toward its neutral position. The turn signal switches are keyboard switches mounted on a printed circuit board secured to the housing. The switches are spaced below the path of the actuator and are actuated by forces perpendicular to the actuator path. Spring elements or flexible levers secured to the circuit board and contacting the switches extend into the actuator path. Deflection of a flexible lever by actuator movement transfers actuating force to the corresponding switch.

3 Claims, 7 Drawing Figures

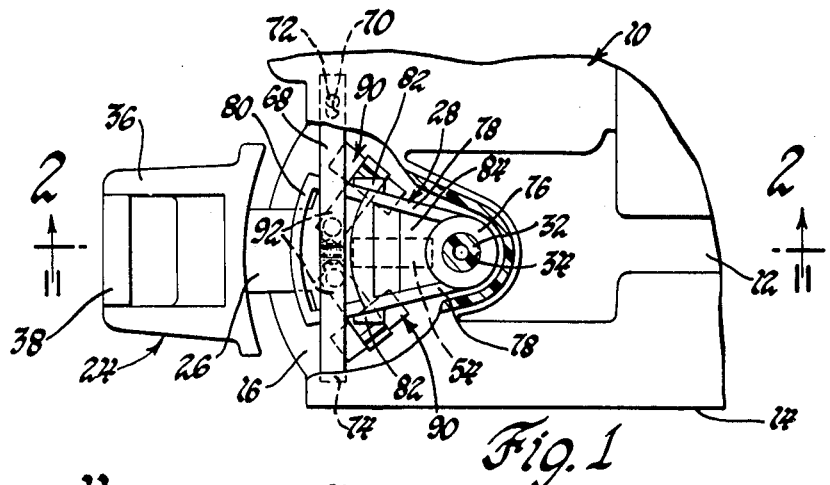
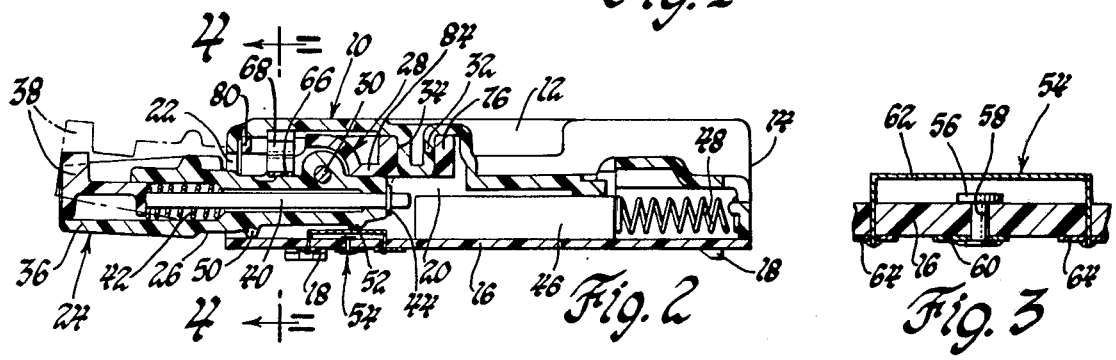
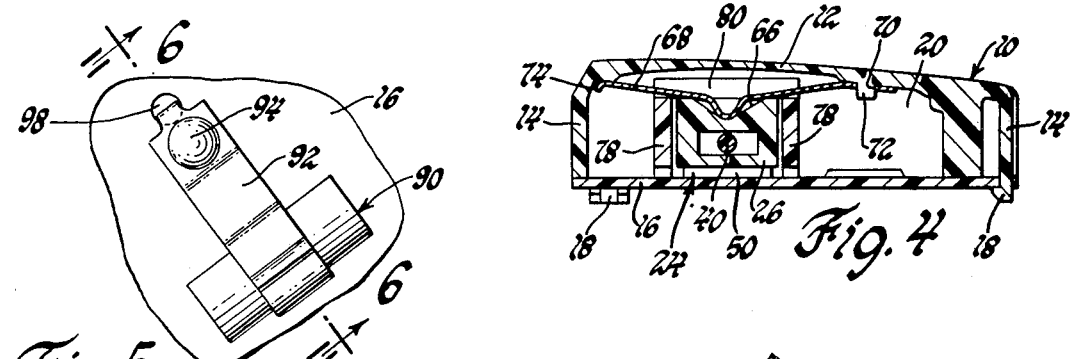
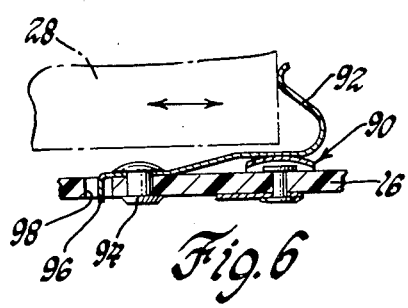
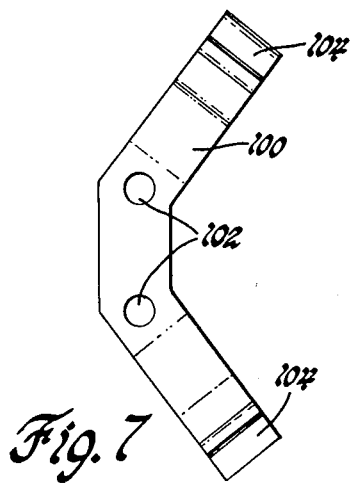

VEHICLE TURN SIGNAL SWITCH ACTUATOR

BACKGROUND OF THE INVENTION

This invention relates to a turn signal switch assembly and more particularly to a switch actuation mechanism therefor.

Traditionally, vehicle turn signal switches have utilized sliding contacts which bodily move with respect to stationary contacts and perform selective bridging functions for switching purposes. A simpler switching arrangement is proposed which is particularly suitable where only a command pulse from the switch unit is needed to initiate the turn signal function. The proposal requires the use of a keyboard switch or other push button switch mounted on a circuit board which extends parallel to the path of the turn signal lever as the lever moves for switch actuation. Various schemes for interconnecting the lever with the switch to accomplish switch actuation are possible. Many such designs, however, are not practical for large scale production of inexpensive switches where large design and manufacturing tolerances are necessary.

It is, therefore, an object of this invention to provide in a turn signal switch mechanism a coupling between a turn signal lever and a push type switch which requires a force perpendicular to the path of movement of the turn signal lever.

This invention is carried out by providing a push button switch on a circuit board and a turn signal lever which moves in a path parallel to and slightly spaced from the circuit board and the switch and a flexible lever secured to the circuit board and engaging both the switch and the turn signal lever to cause switch actuation when it is displaced by the movement of the lever.

BRIEF DESCRIPTION OF THE DRAWINGS

The above and other advantages will be made more apparent from the following specification taken in conjunction with the accompanying drawings wherein like reference numerals refer to like parts and wherein:

FIG. 1 is a partially broken away plan view of a multiple function switch for use in a vehicle according to the invention.

FIG. 2 is a cross-sectional elevation view of the switch of FIG. 1 taken along lines 2—2.

FIG. 3 is a detailed view of a switch structure of FIG. 2.

FIG. 4 is a cross-sectional view of the switch of FIGS. 1 and 2 taken along lines 4—4 of FIG. 2.

FIG. 5 is a plan view of a turn signal switch actuator detail according to the invention.

FIG. 6 is a cross-sectional elevational view of the turn signal actuator detail taken along lines 6—6 of FIG. 5, and FIG. 7 is an alternative embodiment of turn signal switch actuator detail according to the invention.

DESCRIPTION OF THE PREFERRED EMBODIMENTS

FIGS. 1, 2 and 4 show the overall switch structure of a vehicle turn signal switch mechanism combined with a switch mechanism for another vehicle function such as headlight dimming. A molded polymer housing 10 has a top portion 12 and integral side walls 14. A rigid printed circuit board 16 is fastened to the lower ends of the side walls 14 by locking tabs 18 which depend from the side walls and engage the undersurface of the circuit board 16. The housing 12 and circuit board 16 together comprise a support for the switching mechanism and define a switch cavity 20. One of the side walls has an opening 22 through which a turn signal switch lever 24 extends.

The lever 24 comprises a handle portion 26 and an actuator portion 28 which are pivotally connected by a pivot pin 30 which lies parallel to the circuit board 16 and transverse to the longitudinal axis of the lever 24. A pin 32 molded integrally with the housing 10 extends into the switch cavity 20 and defines a pivot axis perpendicular to the circuit board 16. The actuator 28 has a bore 34 at its inner end pivotally coupled to the pin 32 to allow rocking of the lever about the pivot axis. The outer end of the handle 26 terminates in a generally rectangular flat knob 36 which is recessed to receive a sliding switch control element 38. An arcuate rib 50 integrally formed on the lower surface of the handle 26 rests against the circuit board 16 in sliding relation thereto upon the pivoting or rocking movement of the lever 24 about the pivot pin 32. Also in the lower surface near the inner end of the handle 26, an abutment 52 extends toward the circuit board 16. The upper surface of the handle outboard of the pivot pin 32 has a V-shaped ramp surface 66 with its lowest part aligned with the center line of the handle. A leaf spring 68 having an eyelet 70 at one end which fits over a peg 72 on the inner surface of the housing 10 has a center portion which rides in the V-shaped ramp 66 and another end 74 which freely slides on the inner surface of the housing 10. The spring 68 is in the form of a shallow V with a rounded apex which slidably bears on the ramp surface 66. The spring 68 is stressed upon assembly of the switch mechanism so that it urges the handle portion into its neutral position as shown in full line section in FIG. 2 and yet allows the handle to be tilted upwardly as shown in the phantom outline of FIG. 2 to pivot the handle about the pin 30 and actuate a switch 54 by the abutment 52.

The actuator 28 has a hub 76 containing the pivot hole 34, a pair of side walls 78 flaring outwardly from the hub to a bridge 80 interconnecting the walls, and a pair of bosses 82 on the side walls into which the pin 30 is journalled. A reinforcing web 84 between the side walls 78 near the hub 76 terminates short of the leaf spring 68 to leave an opening between the web 84 and the bridge 80 for the leaf spring 68 to extend down to the ramp surface 66. Thus, in operation when the lever is moved from side to side for selective operation of turn signal switches, the actuator pivots about the pin 32 and the apex of the spring 68 rides up the ramp 66 of the handle 26 thereby flexing the spring and producing a camming action which urges the handle back toward neutral position when the lever is manually released.

The handle 26 is hollow throughout its length and contains a push rod 40 which is connected to the element 38 and extends through the switch cavity. A coil spring 42 under compression biases the push rod outwardly while a spring clip 44 on the inner end of the rod 40 prevents the unlimited travel of the rod 40 in the outward direction. A sliding switch mechanism 46 in the cavity inboard of the push rod 44 and in line with the push rod is biased toward the push rod by a coil spring 48 trapped between the switch elemnt 46 and a side wall 14 of the housing. Thus, the switch element 46 which may be used for any desired vehicle function such as windshield washers or vehicle speed control is actuated by manipulation of the slider element 38.

A push button keyboard switch 54 is secured to the circuit board beneath the abutment 52. As best shown in FIG. 3, the keyboard switch 54 comprises a stationary contact button 56 inserted in an opening 58 in the circuit board 16 and terminating on the lower surface of the circuit board where it is soldered to a printed circuit conductor 60. A bridging contact 62 is generally U-shaped and has both ends extending through the circuit board 16 for connection to circuit pathways 64 while the middle of the bridging contact straddles the button contact 56 and is normally slightly spaced from it. Force from the abutment 52 against the bridging contact 62 causes it to flex into engagement with the button contact 56 thereby closing the switch. The bridging contact is formed to effect the switch closing with a snap action and to return to the open position as soon as the force is removed.

As shown in FIGS. 5 and 6 the actual turn signal switches are keyboard switches 90 identical to the switches 54 mounted on the circuit board 16 on either side of the actuator 28 near the outer limit of the travel of the actuator during its pivotal movement. A spring member comprising a flexible lever 92 has one end fastened to the circuit board by a rivet 94 and a bent tab 96 on the end extends through a hole 98 in the circuit board to secure the flexible lever against turning about the rivet 94. The other end of the lever 92 extends above the switch in a generally S shaped curve and terminates at a point in the path of the actuator 28. The intermediate part of the lever at the bottom of the S shaped curve is in contact with the keyboard switch 90 but normally does not produce sufficient force to close the switch. When, however, the actuator 28 moves against the S shaped portion of the lever, then the lever tends to pivot down about the rivet 94 as a fulcrum thereby applying sufficient force to the keyboard switch to cause it to close. Due to the flexibility of the lever 92, the actuator 28 may move in its path beyond the point when the switch closing takes place so that the design or manufacturing tolerance of the switch assembly is not critical for proper operation of the turn signal switches. A separate spring lever 92 is mounted at each side of the actuator 28 for actuation of the right and left turn signal switches respectively. FIG. 7, however, shows a unitary spring lever assembly 100 equivalent to two conjoined spring levers 92 with holes 102 for riveting to the circuit board and opposite ends 104 properly positioned for the actuation of each turn signal switch.

It will thus be seen that the turn signal switch according to the invention comprises an easily fabricated structure which does not require close tolerances and which invites flexible design approaches to the switching arrangement. For example, wide variations in the spacing of the lever from the circuit board are readily tolerated and in addition the amount of movement of the lever both before and after the actual switch closing is subject to wide design variances. The structure is appropriate for use with a signal system wherein only a command pulse is required to initiate or terminate the signalling function allowing the actuator to return to neutral once the pulse has been generated, as well as with a traditional system which requires the switch be held closed for the entire duration of the signalling.

The embodiments of the invention in which an exclusive property or privilege is claimed are defined as follows:

1. A turn signal switch assembly comprising
a support having a mounting surface,
a manually operable turn signal lever pivotally mounted on the support for rocking movement in a path generally parallel to the mounting surface,
right and left turn signal switches on the mounting surface for selective operation by the lever upon rocking movement thereof in either direction, an element of each switch being movable generally perpendicular to the path of the lever for switch actuation, and
means for translating the lever motion to a switch actuating motion comprising yieldable leaf spring means secured to the support and lying in part between the lever and each switch, the spring means having for each switch a portion extending into the path of the lever so that movement of the lever against the portion causes deflection of the spring means against the said element in a direction to actuate the switch.

2. A turn signal switch assembly comprising
a support having a mounting surface,
a manually operable turn signal lever pivotally mounted on the support for rocking movement between two limits in a path generally parallel to the mounting surface,
right and left turn signal switches on the mounting surface adjacent the limits of the path of the lever for selective operation by the lever upon rocking movement thereof in either direction, an element of each switch being movable generally perpendicular to the path of the lever for switch actuation, and
means for translating the lever motion to a switch actuating motion comprising yieldable leaf spring means secured to the mounting surface and lying in part between the lever and each switch, the spring means having for each switch an arcuate cam portion extending generally transverse of the mounting surface into the path of the lever so that movement of the lever against the cam portion causes deflection of the spring means toward the mounting surface against the said element to actuate the switch.

3. A turn signal switch assembly comprising
a support comprising a housing and a circuit board having a mounting surface,
a manually operable turn signal lever pivotally mounted on the support for rocking movement in a path generally parallel to the mounting surface,
right and left turn signal switches on the circuit board mounting surface connected to conductors on the circuit board and positioned adjacent the limits of the path of the lever for selective operation by the lever upon rocking movement thereof in either direction, an element of each switch being movable generally perpendicular to the path of the lever for switch actuation, and
means for translating the lever motion to a switch actuating motion comprising for each switch a yieldable spring lever secured to the circuit board by a fastener extending through the spring and the circuit board and by a tang on the spring formed to engage a cooperating aperture in the circuit board, the spring lever lying in part between the turn signal lever and the switch, each spring lever having an arcuate cam portion extending away from the mounting surface into the path of the turn signal lever so that movement of the turn signal lever against the cam portion causes deflection of the spring lever toward the mounting surface against the said element to actuate the switch.

* * * * *